United States Patent [19]

Siol et al.

[11] Patent Number: 5,212,237
[45] Date of Patent: May 18, 1993

[54] POLYMER MIXTURES

[75] Inventors: Werner Siol, Darmstadt-Eberstadt; Thomas Suefke, Rossdorf; Ulrich Terbrack, Reinheim; Reiner Mueller, Biesbesheim, all of Fed. Rep. of Germany

[73] Assignee: Roehm GmbH, Darmstadt, Fed. Rep. of Germany

[21] Appl. No.: 485,548

[22] Filed: Feb. 27, 1990

[30] Foreign Application Priority Data

Mar. 4, 1989 [DE] Fed. Rep. of Germany ....... 3907018

[51] Int. Cl.$^5$ .................. C08L 51/04; C08L 51/06
[52] U.S. Cl. ...................................... 525/64; 525/69; 525/902
[58] Field of Search .............................. 525/64, 69, 902

[56] References Cited

U.S. PATENT DOCUMENTS

| | | | |
|---|---|---|---|
| 3,642,940 | 2/1972 | Burg | 525/64 |
| 3,749,755 | 7/1973 | Bronstert | 525/64 |
| 4,639,488 | 1/1987 | Schuette | 524/456 |
| 4,670,508 | 6/1987 | Ohdaira et al. | 525/64 |
| 4,713,414 | 12/1987 | Kusumgar | 525/64 |

FOREIGN PATENT DOCUMENTS

| | | |
|---|---|---|
| 115373 | 8/1984 | European Pat. Off. |
| 0156285 | 10/1985 | European Pat. Off. |
| 181541 | 5/1986 | European Pat. Off. |
| 192356 | 8/1986 | European Pat. Off. |
| 2420300 | 12/1975 | Fed. Rep. of Germany |
| 2659357 | 7/1978 | Fed. Rep. of Germany |
| 2709037 | 9/1978 | Fed. Rep. of Germany |
| 3441547 | 5/1986 | Fed. Rep. of Germany |
| 2376189 | 7/1978 | France |
| 45-030353 | 1/1970 | Japan |
| 60-108413 | 6/1985 | Japan |
| 0338303 | 10/1989 | Japan |
| 1590549 | 12/1977 | United Kingdom |
| 1595282 | 3/1978 | United Kingdom |

Primary Examiner—Ralph H. Dean, Jr.
Attorney, Agent, or Firm—Oblon, Spivak, McClelland, Maier & Neustadt

[57] ABSTRACT

Polymer mixtures of:
(A) 2 to 98 wt. % of a polymer containing at least 80 wt. % of the repeating unit —($CH_2$—O)—; and (B) 98 to 2 wt. % of a polymer containing at least to 90 wt. % of a polymer B1 which contains at least 60 wt. % of a monomer of the formula (I)

$$CH_2=\overset{H}{\underset{|}{C}}-X-R \qquad (I)$$

in which R is an alkyl group with 1 to 3 carbon atoms and X is $$-O-\overset{O}{\underset{\|}{C}}- \text{ or } -\overset{O}{\underset{\|}{C}}-O-,$$

and 80-10 wt. % of a polymer B2 having a glass transition temperature, Tg, below 0° C., and which is covalently bonded with at least 5 wt. % of the polymer containing the monomers of formula I exhibit high solvent resistance and good mechanical properties.

14 Claims, No Drawings

POLYMER MIXTURES

BACKGROUND OF THE INVENTION

1. Field of the Invention

The present invention relates to polymer mixtures of polyoxymethylene and modified polyacrylates, which can be thermoplastically processed.

2. Discussion of the Background

Controlling the properties of polymeric plastics by admixing other polymers with complementary properties is a technical concept that has been applied for a long time with impressive results (see: N. A. J. Platzer, *Multicomponent Polymer Systems, Advances in Chem. Ser.* 99, XI-XVIII, American Chemical Society, Washington, 1971; H. F. Mark, *Encyclopedia of Polymer Science and Engineering,* 2nd Ed., Vol. 12, pp. 399 to 461, J. Wiley & Sons, 1988). The blending frequently is intended to improve the impact strength properties of a plastic.

In other cases, the blending is carried out to replace relatively costly plastics by economical components.

In the case of polyoxymethylene (POM), it is not as likely to be deficiencies in the property profile as price considerations that justify blending with other plastics. Precisely because of its favorable mechanical properties (hardness, rigidity, toughness down to low temperatures), and its resistance to solvents, polyoxymethylene has gained a firm position among structural materials (see: H. F. Mark et al., *Encyclopedia of Polymer Science and Engineering,* 2nd Ed , Vol. 1, pp. 42-61, J. Wiley, 1986; *Winnacker-Küchler Chemische Technologie,* 4th Edition, Vol. 6; *Org Technologie II,* 4th Edition, Carl Hanser, Munich, 1982).

A number of examples of blends of polyoxymethylene with other plastics, which apparently pursue very diverse technological objectives, yet without the intention or achievement of true compatibility of the components are known. Thus, DE-A 27 09 037 describes a coating paste for projectile propellant charges that is obtained from a solution of POM, polymethyl methacrylate (PMMA), and paraformaldehyde in toluene (see: *Chemical Abstracts,* vol. 90, 206,733h). The property of POM of forming crystalline fibers has been utilized in various ways to produce fiber-reinforced plastics, including those based on PMMA (see: *Chemical Abstracts,* vol. 83, 148,276m; and *Chemical Abstracts,* vol. 87, 85,985u).

A high degree of attention has been directed to improving the impact strength of POM by blending with elastomers, for example acrylonitrile-grafted ethylene-propylene rubber (*Chemicals Abstracts,* vol. 99, 187,894c) or MMA-grafted polybutadiene (see: DE-A 34 41 547), or butadiene-MMA block copolymers DE-A 24 20 300) or butadiene-styrene or acrylonitrile-butadienestyrene graft copolymers (DE-A 19 31 392). Other impact strength modifications are acrylonitrile/styrene- or styrene-grafted polyoxymethylene (DE-A 26 59 357). Japanese Laid Open Patent Application 60-108,413 (*Chemical Abstracts,* vol. 104, 6,621r) recommends the production of high impact strength POM by polymerization of trioxane in the presence of an elastomer, for example an ethylenepropylene-2-hydroxyethyl methacrylate copolymer (see: also *Chemical Abstracts,* vol. 103, 19,692v). European Patent Application 115,373 recommends the addition of a multiphase crosslinked elastomeric copolymer to POM mixtures with a $C_{10}$-$C_{30}$-alkyl $C_2$-$C_7$-fatty acid ester and polymers such as caprolactam-caprolactone copolymers or polybutyl methacrylate, which are compatible with the fatty acid ester and inert toward POM. In German Patent Application P 38 05 052, compatible polymer mixtures of polyoxymethylene and 99.5 to 0.5 wt. % of a polymer that consists of 40 to 100 wt. % methyl acrylate or ethyl acrylate are described. Even in small proportions, the polyacrylate additives have a favorable effect on the processability of POM. However, there remains a need for POM mixtures which possess high solvent resistance and good mechanical properties and are thermoplastically processible.

SUMMARY OF THE INVENTION

Accordingly, one object of the present invention is to provide elastically modified POM, in which the high crystallization tendency of POM is exhibited in the mixture.

It is another object of the present invention to provide polymer mixtures of POM which possess high solvent resistance and good mechanical properties and are thermoplastically processible.

These and other objects, which will become apparent during the course of the following detailed description, have been achieved by polymer mixtures which comprise:

(A) 2 to 98 wt. %, preferably 4 to 50 wt. % or 70 to 98 wt. %, of a polymer that comprises at least 80 wt. % of the monomer unit —($CH_2O$)—; and (B) 98 to 2 wt. %, preferably 96 to 50 wt. % or 30 to 2 wt. %, of a polymer comprising 20 to 90 wt. % of a polymer B1 comprising at least 60 wt. %, preferably 90 wt. % of repeating units derived from monomers of the formula (I)

(I)

in which R stands for an alkyl group with 1 to 3 carbon atoms and X stands for a

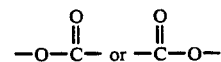

group, and 80 to 10 wt. % of a polymer B2, preferably chemically crosslinked, with a glass transition temperature, Tg, below 0° C., that is covalently bonded, preferably grafted, with at least 5 wt. % of the polymer B1 formed from the monomers of Formula (I).

DETAILED DESCRIPTION OF THE PREFERRED EMBODIMENTS

Thus, the present mixtures contain 2 to 98 wt. % of component (A) based on the sum of the weights of components (A) and (B). Of particular interest, for example, are plastic mixtures with a proportion of component (A) in the range of 4 to 50 wt. % or in the range of 70 to 98 wt. %, particularly 80 to 95 wt. %. Accordingly, the present mixtures contain 98 to 2 wt. % of component (B), and mixtures containing component (B) in proportions of 96 to 50 wt. % and 30 to 2 wt. %, particularly 20 to 5 wt. %, are of special interest.

Particularly favorable properties are produced when the polymer component (A) used in the plastic mixtures is a typical commercial POM, and particularly when the polymers that are used as component (B) have a core-shell structure, particularly core-shell polymers produced by emulsion polymerization.

Suitable core materials with a glass transition temperature <0° C., preferably <−10° C., are well-known elastomers, especially those chosen from the group of polyacrylates, polysiloxanes, polyolefins, especially polybutadienes, polyisoprenes, and ethylene-propylene elastomers (EPDM, EPTM).

Polyoxymethylene (POM) in the context of this invention means the polymers discussed above which are made up entirely or to the extent of at least 80 wt. % of —($CH_2$—O)—units, i.e., the homopolymers or copolymers usually combined under the term POM, especially in the stabilized forms, specifically the commercial forms. It is well known that POM homopolymers can be prepared, for example, by anionic polymerization of formaldehyde, for example in suspension, followed by end group stabilization, with trialkylamines or alkali metal alkoxides being used as initiators. Stabilization can be accomplished, for example, by acylation or etherification of the terminal hemiacetal OH groups, for example with acid anhydrides such as acetic anhydride, or with epoxides such as ethylene oxide.

Copolymers of the POM type can be obtained, for example, by cationic suspension polymerization, starting from formaldehyde or trioxane, for example, with Lewis acids such as $BF_3$ or $HClO_4$. Examples of copolymerization components that can be used for POM are ethylene oxide, dioxolane, or butanediol formal (approx. 2–4 wt. %). An aliphatic or cycloaliphatic hydrocarbon is generally used as the suspension medium. The mean molecular weight (number average) is usually in the range between $Mn=20,000$ and $Mn=100,000$, and the nonuniformity $Mw/Mn$ is about 2. The homopolymers have a higher degree of crystallization (up to 90%) and thus somewhat higher hardness, rigidity, and strength than the copolymers.

Polyoxymethylene dissolves, for example, in hexafluoroacetone sesquihydrate, and at higher temperatures in m-cresol. Polyoxymethylenes stabilized in the way described above are advantageously used, as is customary. In practical application, the polymer mixtures may also contain well-known additives such as plasticizers, lubricants, dyes and pigments, fillers, and other stabilizers in the customary amounts, i.e., in general <20 wt. % based on the polymer mixtures. (see: R. Gächter and H. Müller, *Taschenbuch der Kunststoff-Additive*, Carl Hanser Verlag). Examples of suitable commercial POM products are DELRIN ® 500 F or 900 F of the DuPont Co.; CELCON ® of Celanese Engineering Resins, or HOSTAFORM ® of Ticona Polymerwerke, Kelsterbach.

In a preferred embodiment, Component (B) is prepared by emulsion polymerization (see: *Houben-Weyl*, 4th Edition, Vol. XIV/1, 133–491, Georg Thieme Verlag, 1961; H. F. Mark et al., *Encyclopedia of Polymer Science an Engineering*, 2nd Ed., Vol. 6, pp. 1–51, J. Wiley & Sons, 1986; and H. Rauch-Puntigam, Th. Völker, *Acryl- und Methacrylverbindungen*, Springer Verlag, 1967). The glass transition temperature of the homopolymers or copolymers formed from the monomers is well known or can be calculated (see: Brandup-Immergut, *Polymer Handbook*, 2nd Ed., J. Wiley; and Vieweg-Esser, *Kunstoff-Handbuch*, Volume IX, pp. 333–340, Carl-Hanser Verlag, 1975).

Core-shell latices of the acrylate type can be prepared as Component (B), for example, by the methods described in U.S. Pat. No. 4,199,486, European Patent 65,069, U.S. Pat. No. 4,710,525, U.S. Pat. No. 3,787,522, U.S. Pat. No. 3,943,190, U.S. Pat. No. 3,914,338, U.S. Pat. No. 4,052,525, or U.S. Pat. No. 3,985,703.

The construction of the polymers (B) from a core material and the shell material based on acrylate can be achieved, for example, by the following procedures.

The monomers constituting the core material may be polymerized in aqueous emulsion in the first process step to give polymer (B2). When the monomers of the first step are essentially completely polymerized, the monomer components of the shell material are added to the emulsion polymer under conditions such that the formation of new particles is avoided. Because of this, the polymer formed in the second step is deposited around the core material in shell form. A favorable ratio of shell thickness to the size of the core is obtained when the ratio by weight of core material to shell material is from 1:3 to 3:1. By suitable choice of the amount of emulsifier, the particle size can be controlled in such a way that the smaller the amount of emulsifier, the larger the particles become. The particle diameters, for example, can be in the range of 0.05 to 5 μm.

Butyl acrylate and 2-ethylhexyl acrylate are preferably used as monomers for the core material in this case. The core material is advantageously prepared using known monomeric crosslinking agents, most preferably in proportions of 0.1 to 10 wt. %, more preferably 0.03 to 3 wt. %, based on the weight of the monomers constituting the core material.

The crosslinking agents used are compounds that have at least two vinyl double bonds in the molecule, for example, the (meth)acrylic esters of polyfunctional alcohols such as ethylene glycol dimethacrylate, butanediol diacrylate, tetraethylene glycol diacrylate, trimethylolpropane triacrylate, pentaerythritol tetraacrylate, and others, including allyl methacrylate. Polymethyl acrylate or polyethyl acrylate are suitable shell materials.

In the first polymerization step, in which the polymer B2, or the core material, is formed, 0.01 to 1 wt. % based on the water phase of anionic, cationic, or nonionic emulsifiers is used, such as sodium lauryl sulfate, alkylbenzenesulfonates, ethoxylation products of alkylated phenols, or their neutralized sulfonation products. Polymerization is initiated preferably at temperatures between 60° and 100° C. using water-soluble sources of free radicals such as potassium or ammonium persulfate or hydrogen peroxide. An initiator can be added again before beginning the second polymerization step, but little or no additional emulsifier is used in the second step. Particularly interesting technical properties are found with an emulsion polymer of the following structure:

Core: Copolymer of butyl acrylate, allyl methacrylate, trimethylolpropane triacrylate in the weight ratio 98:1:1.

Shell Polymethyl acrylate (100 wt. %)

When blending such a core-shell material (24 g) with polyoxymethylene (DELVIN ® 500 F, 16 g) at 195° C. on a Brabender blender, for example, a white, dimensionally stable rubber is obtained with very good solvent resistance.

A suitable polymer component (B) is also obtained using ethylene-propylene elastomers such as EPDM or EPTM as polymer B2.

These elastomers are well known, see *Ullmann's Encyclopadie der Techn. Chemie*, 4th Edition, Vol. 13, 619–620, Verlag Chemie, 1977; and H. F. Mark et al., *Encyclopedia of Polymer Science & Engineering*, 2nd Ed., Vol 6, 523–564, J. Wiley & Sons, 1986.

In general, ethylene and propylene are present in a molar ratio of 5:1 to 1:3.5. The molecular weight is usually in the range of 100,000 to 500,000. The concomitant use of other o-monoolefins in the range up to 16 carbon atoms is also possible. Between 0.1 and 10 mole-% of a linear diene or of an unsaturated, bridged ring hydrocarbon with at least one carbon-carbon double bond is beneficially also copolymerized, for example unsaturated derivatives of bicyclo[2.2.1]heptane, such as 5-alkylidene-2-norbornene, dicyclopentadiene, or bicyclo[2.2.1]heptadiene. In general, the content of double bonds is in the range of 3 to 20 double bonds, preferably 6 to 15 double bonds per 1,000 carbon atoms. EPDM elastomers are the subject of U.S. Pat. Nos. 2,933,480, 3,211,709, 2,093,620, 3,093,621, 3,113,115, and 3,300,450, for example.

The ethylene-propylene elastomers can be grafted in various ways, for example in organic solvents or in the monomer. In the first case, for example, an ethylene-propylene-diene elastomer (EPDM), such as the commercial products EPSYN ® 55 (product of the Copolymer Co.) or Polysar ® 585, is used in a suitable solvent such as toluene, chlorobenzene, or butyl acetate. One or more vinyl comonomers can optionally be copolymerized in addition to those of Formula (I), for example styrene and alkylated derivatives (especially those with alkyl groups containing 1 or 2 carbon atoms) (see: U.S. Pat. No. 3,981,958, and U.S. Pat. No. 3,671,608).

The procedure is preferably carried out under an inert gas such as nitrogen or carbon dioxide, for example, in any conventional polymerization vessel provided with a stirrer. Examples of initiators that can be used are known peroxide initiators such as benzoyl peroxide, t-butyl peroctoate, di-t-butyl peroxide, ordinarily in amounts of about 0.01 to 2 wt. % based on the monomers. The polymerization is usually initiated by raising the temperature, for example, to above 60° C. and up to the boiling point of the solvent, and is ordinarily also carried out at elevated temperature. The monomers plus initiator can advantageously be added in portions to the elastomer in the vessel. The total time of polymerization is usually in the range of several hours, or may extend over one or more working days. Solvents and unreacted monomer can beneficially be removed at reduced pressure, and with particular advantage using an extruder, for example a Leistritz extruder. To separate the polymer from a latex, the method disclosed in DE-OS 29 17 321 may be used. Analysis of the grafted fractions can be accomplished by the "reprecipitation chromatography" technique. (See: J. Ma, D. Pang, and B. Huand, *J. Polym. Sci. A., Polym. Chem.*, vol. 24, pp. 2853–2866 (1986); and A. Gadkari & M. F. Farona, *Polym. Bull.*, vol. 17, pp. 299–306 (1987).

So-called "soluble rubber" can also be used as the elastomer in analogy to EPDM/EPTM.

Also suitable as elastomers in the context of this invention are butyl rubber (IIR, see: *Ullmann, loc. cit.*, Vol. 13, pp. 621–623; and H. F. Mark et al., *Encyclopedia of Polymer Science & Engineering*, 2nd Ed., Vol. 8, 423–487, J. Wiley & Sons, 1987); polyisoprene (IR, see: *Ullmann, loc. cit.*, Vol. 13, pp. 617–621; and H. F. Mark et al., *Encyclopedia of Polymer Science & Engineering*, 2nd Ed., Vol. 8, 487–564 J. Wiley & Sons, 1987); polybutadiene (BR, see: *Ullmann, loc. cit.*, Vol. 13, pp. 602–605, and H. F. Mark et al., *Encyclopedia of Polymer Science & Engineering*, 2nd Ed., Vol. 2, pp. 537–590, J. Wiley & Sons, 1987).

Elastomers resulting from polycondensation such as silicone rubber are also usable (Q., see: *Ullmann, loc. cit.*, Vol. 13, 628–631).

However, all of these elastomers are at least partly covalently bonded to the polymers B1 containing the monomers with the formula

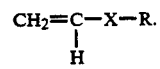
$$CH_2=\underset{H}{\overset{|}{C}}-X-R.$$

The mixtures may be prepared in a known way, for example by mechanical mixing, advantageously from particles already reduced in size, or with size reduction during the mixing process and melting of the mixture. The mixing can advantageously be done in an extruder (see: German Patent Application P 37 43 199.4 filed Dec. 19, 1987).

In the case of mechanical mixing, mixtures of the components are first prepared, preferably from substances already in particle form, usually using slow mixing units such as drum mixers, squirrel cage mixers, or double-chamber blade mixers. The slow mixing units cause mechanical mixing without eliminating the phase boundaries (see: *Ullmann's Encyclopädie de Technischen Chemie*, 4th Edition, Vol. 2, pp. 282–311, Verlag Chemie). The thermoplastic treatment then occurs by homogeneous mixing in the melt using heated mixing units at temperatures suitable for this, for example 150° to about 300° C. in kneaders or preferably extruders, for example single-screw or multiple-screw extruders, or optionally in extruders with oscillating screws and shear pins, for example, in a BUSSCO kneader.

Granulates with uniform particles (for example, hot cutoff, cubic shape, round grain) can be prepared by these procedures. The particle size of the granulates is in the range of 2 to 5 mm. The mixing of dispersions (emulsions) of the constituents followed by removal of the liquid phase, for example by squeezing out in an extruder, represents another advantageous embodiment.

Component (B) of the present plastic mixtures consists of 80–10 wt. % of the elastomers mentioned above with a Tg<0° C., and 20–90 wt. % of polymers that contain predominantly, particularly at least 60 wt. %, preferably at least 90 wt. %, and more preferably entirely of monomers of the formula (I)

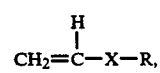
$$CH_2=\underset{H}{\overset{|}{C}}-X-R,$$

in which R stands for an alkyl group with 1–3 carbon atoms and X stands for a

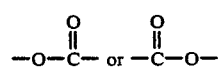
$$-O-\overset{O}{\underset{}{\overset{\|}{C}}}-\text{ or }-\overset{O}{\underset{}{\overset{\|}{C}}}-O-$$

group, with the proviso that the polymer B1 is grafted to the extent of at least 5 wt. %, preferably at least 10 wt. %, to the polymer B2 (the elastomer).

Polymers B1 in which X stands for a

group are preferred. Especially preferred, therefore, are polymers B1 that are made up of at least 60 wt. % of the monomers methyl, ethyl, or propyl acrylate, with methyl and ethyl acrylate being particularly preferred. If X represents

vinyl acetate is preferred as the monomeric unit of the polymer B1. Other monomers copolymerizable with the monomers of Formula I can be included in the polymer B1 in proportions up to 40 wt. %, preferably in proportions <10 wt. %. Examples of such other monomers that may be mentioned are ethylene, styrene, methacrylic esters of $C_1$-$C_{18}$ alcohols, and other vinyl compounds (see: *Ullmann, loc. cit.,* 3rd Edition, Vol. 14, 108–109, Urban & Schwarzenberg 1963). In a very particularly preferred embodiment, the polymer B1 consists of at least 96 wt. % of the monomers of Formula I.

The beneficial effects of the present mixtures may be illustrated by way of example of the method of implementation with POM as Component (A) and a core-shell polymer as Component (B) (copolymer of butyl acrylate, allyl acrylate, and trimethylolpropane triacrylate 98:1:1 parts by weight, as described above).

Such a blend of core-shell polymer and POM shows high crystallinity of the POM fraction even with a low POM content. This circumstance is likely to contribute at least substantially to the observed resistance of the polymer mixtures of the present invention to solvents.

On the other hand, mixtures with a high proportion (70 to 98 wt. %) of POM represent improved POM plastics with regard to toughness and processing behavior.

Other features of the invention will become apparent in the course of the following descriptions of exemplary embodiments which are given for illustration of the invention and are not intended to be limiting thereof.

EXAMPLES

The melt viscosity ($\eta_s$) is determined according to DIN 54 811 Procedure B.

The particle diameter is determined with a Coulter ® NanoSizer. The particle diameter can also be determined by light scattering.

The elongation at failure and the tensile strength are determined by the method DIN 53 455.

The Shore hardness is determined according to DIN 3 505.

EXAMPLE 1

Preparation of an Emulsion Polymer with Core-Shell Structure (Component B).

In a polymerization flask with stirrer, reflux condenser, and thermometer are placed:

1.0 g of potassium persulfate as initiator; and
0.06 g of sulfated triisobutylphenol, ethoxylated with 7 moles of ethylene oxide, sodium salt, as emulsifier, in 630.0 g of distilled water;

and the mixture is heated to 80° C.

Uniformly metered into this starting formulation with stirring over a period of 2.5 hours is an emulsion I consisting of:

1631.0 g of butyl acrylate,
8.3 g of allyl methacrylate,
8.3 g of trimethylolpropane triacrylate,
3.0 g of potassium persulfate,
5.0 g of the aforementioned emulsifier, and
1877.0 g of distilled water.

Analysis of a sample shows that the polymer dispersion prepared in this way has a particle diameter of 346 nm.

Added directly thereafter to Emulsion I over 1.5 hours at 80° C. is an Emulsion II consisting of:

900.0 g of methyl acrylate,
2.0 g of potassium persulfate,
1.5 g of the aforementioned emulsifier, and
1345.0 g of distilled water.

After cooling to room temperature, a polymer dispersion is obtained with a solids content of 39.8% and a particle diameter of 386 nm.

To obtain the solid polymer, the dispersion is frozen for 48 hours at −16° C. After thawing, the solid is separated, washed three times with water, and dried under vacuum at 50° C.

EXAMPLE 2

Preparation and Characterization of the Plastic Mixtures

| | |
|---|---|
| Component (A): | POM |
| Component (B): | Emulsion polymer with core-shell structure |
| Component (B2): | Polybutyl acrylate crosslinked with 0.5 wt. % allyl methacrylate and 0.5 wt. % trimethylolpropane triacrylate. |
| Component (B1): | Polymethyl acrylate, partly grafted to (B2). |

POM (Delrin ® 500 F from the Du Pont Co., see: Delrin, *Acetal Resins Design Handbook,* E.I. Du Pont de Nemours & Co. Inc., Wilmington, Del., 1967), is mixed in various proportions with the solid polymer from Example 1 on an extruder. The resulting plastic mixtures can be processed excellently.

EXAMPLE 2a

Plastic Mixture with a High Content of Polyoxymethylene (POM).

A mixture of 95 wt. % POM (Delrin ® 500 F from the Du Pont Co.) is blended with 5 wt. % of the solid from Example 1. The mixture can be extruded readily at 180° C. into strands. In contrast, pure POM shows no strand strength. At the processing temperature of 180° C. (load 5 N), a viscosity, $\eta_s$, of 447 Pa s is measured, and the strand elongation, B, is 27%.

In spite of the significantly improved extrudability, the plastic mixture still exhibits the good mechanical properties of POM. Thus, the following values are measured on injection-molded standard small bars (measured data for pure POM in parentheses).

Impact strength (KJ/m$^2$): no fracture (74.3)

Notched impact strength (KJ/m²): 6.1 (5.8)

VST (measured on an injection-molded specimen 3 mm thick)(° C): 154 (160) (Vicat B, 16 hours 80° C.).

EXAMPLE 2b

Plastic Mixture with a Low Content of Polyoxymethylene (POM).

90 parts by weight of the solid obtained from Example 1 is mixed with 10 parts of POM (Delrin ® 500 F) and granulated. On the one hand, strands were extruded from this (measured values: stress at failure: 1.4 MPa, elongation at failure: 164%), and on the other hand the material was pressure-molded into articles and injection-molded into shaped articles 60×40×3 mm in size (measured values: tensile strength: 1.58 MPa, elongation at failure: 179%, Shore hardness A: 34).

As clearly shown by the results given above, molded objects of high strength are obtained with an increased proportion of POM.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A polymer mixture, comprising:
(A) 2 to 98 wt. % of a first polymer which comprises at least 80 wt. % of the repeating unit —($CH_2$—O)—; and
(B) 98 to 2 wt. % of a second polymer comprising
   (i) at least 20 to 90 wt. % of a polymer B1 which comprises at least 90 wt. % of monomer units derived from monomers of the formula I $$CH_2=\overset{H}{\underset{|}{C}}-X-R \qquad (I)$$

wherein R is an alkyl group having 1 to 3 carbon atoms and X is $$-O-\overset{O}{\underset{\|}{C}}-\text{ or }-\overset{O}{\underset{\|}{C}}-O-,$$

and
   (ii) 80 to 10 wt. % of a polymer B2 having a glass transition temperature, Tg, below 0° C., wherein polymer B2 is covalently bonded with at least 5 wt. % of said polymer B1, wherein said polymer B is a polymer with a core-shell structure, wherein polymer B1 comprises the shell and polymer B2 comprises the core, and wherein said polymer B2 is selected from the group consisting of elastomeric polyacrylates and polyolefins.

2. A polymer mixture, comprising:
(A) 2 to 98 wt. % of a first polymer which comprises at least 80 wt. % of the repeating unit —($CH_2$—O)—; and
(B) 98 to 2 wt. % of a second polymer comprising
   (i) at least 20 to 90 wt. % of a polymer B1 which comprises at least 90 wt. % of a monomer units derived from monomers of methyl acrylate and
   (ii) 80 to 10 wt. % of a polymer B2 having a glass transition temperature, Tg, below 0° C., comprising monomer units derived from monomers of butyl acrylate, wherein polymer B2 is covalently bonded with at least 5 wt. % of said polymer B1, wherein said polymer B is a polymer with a core-shell structure, wherein polymer B1 comprises the shell and polymer B2 comprises the core.

3. The mixture of claim 1, wherein said monomer of formula I is selected from the group consisting of ethyl acrylate, methyl acrylate, propyl acrylate, isopropyl acrylate, vinyl acetate, and vinyl propionate.

4. The mixture of claim 1, wherein said polymer (B) is prepared by emulsion polymerization.

5. The mixture of claim 1, comprising 4 to 50 wt. % of polymer (A) and 96 to 50 wt. % of polymer (B).

6. The mixture of claim 1, comprising 70 to 98 wt. % of polymer (A) and 30 to 2 wt. % of polymer (B).

7. The mixture of claim 1, wherein said polymer (A) is a homopolymer of formaldehyde with end groups stabilized by acylation or etherification.

8. The mixture of claim 1, wherein polymer B2 has a glass transition temperature, Tg, less than −10° C.

9. The mixture of claim 1, wherein the core of said core-shell polymer comprises 0.1 to 10 wt. % of a crosslinking monomer.

10. The mixture of claim 9, wherein said crosslinking monomer is selected from the group consisting of ethylene glycol dimethacrylate, butanediol diacrylate, tetraethylene glycol diacrylate, trimethylolpropane triacrylate, pentaerythritol tetraacrylate, and allyl methacrylate.

11. The mixture of claim 1, wherein the core of said core-shell polymer is a copolymer of butyl acrylate and 2-ethylhexyl acrylate.

12. The mixture of claim 1, wherein polymer (A) and polymer (B) are mixed in an extruder.

13. The mixture of claim 1, wherein said polymer B1 comprises at least 96 wt. % of said monomer units of formula I.

14. The mixture of claim 1, wherein said polymer B2 comprises an ethylene-propylene elastomer.

* * * * *